United States Patent [19]

Packard

[11] 3,739,352

[45] June 12, 1973

[54] VARIABLE WORD WIDTH PROCESSOR CONTROL

[75] Inventor: Roger E. Packard, Santa Barbara, Calif.

[73] Assignee: Burroughs Corporation, Detroit, Mich.

[22] Filed: June 28, 1971

[21] Appl. No.: 157,297

[52] U.S. Cl. .............................................. 340/172.5
[51] Int. Cl. .............................................. G06f 9/00
[58] Field of Search .................. 340/172.5; 235/157

[56] References Cited

UNITED STATES PATENTS

| | | | |
|---|---|---|---|
| 3,331,056 | 7/1967 | Lethin et al. | 340/172.5 |
| 3,654,621 | 4/1972 | Bock et al. | 340/172.5 |
| 3,510,847 | 5/1970 | Carlson et al. | 340/172.5 |
| 3,377,620 | 4/1968 | Sims | 340/172.5 |

*Primary Examiner*—Paul J. Henon
*Assistant Examiner*—Mark Edward Nusbaum
*Attorney*—Christie, Parker & Hale

[57] ABSTRACT

There is described a microprogrammed processor associated with a free field memory in which operands of any length in terms of the number of bits can be processed. The free field memory is addressed by an address register that points to the boundary between any two bits stored in the memory as the start of a field and that specifies the number of bits in the field up to the maximum bit capacity of the memory. A control register, referred to as a bias register, determines the number of bits in parallel, up to a maximum number of parallel bits accommodated by one memory cycle, required in the execution of particular microinstructions. Any microoperator string involving the manipulation of operands, such as an arithmetic operation or a data transfer operation, includes a bias operation in which the bias register is set to the lesser of the number of bits specified by the address register and the maximum number of bits transferred in one memory cycle. Once the bias register is set, it is used to control internal operations within the processor and transfers between the processor and memory as though the basic width of the machine had been changed.

21 Claims, 6 Drawing Figures

INVENTOR.
ROGER E. PACKARD
BY
Christie, Parker & Hale
ATTORNEYS

FIG. 3

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| MOVE | 0 | 0 | 0 | 1 | SOURCE REGISTER | | | | | | SINK REGISTER | | | | | |
| SCRATCHPAD MOVE | 0 | 0 | 1 | 0 | SOURCE OR SINK REGISTER | | | | | | S/S | A/B | CELL ADDRESS | | | |
| READ/WRITE MEMORY | 0 | 1 | 1 | 1 | R/W | COUNT FA/FL | | | REG | | | TRANSFER WIDTH | | | | |
| BRANCH | 1 | 1 | 0 | BRANCH ADDRESS | | | | | | | | | | | | |
| COUNT FA/FL | 0 | 0 | 0 | 0 | 0 | 1 | 1 | 0 | COUNT FA/FL | | | LITERAL | | | | |
| EXCHANGE | 0 | 0 | 0 | 0 | 0 | 1 | 1 | 1 | SINK ADDRESS | | | | SOURCE ADDRESS | | | |
| BIAS | 0 | 0 | 0 | 0 | 0 | 0 | 0 | 0 | 0 | 0 | 1 | 1 | VARIANTS | | | TEST |
| SHIFT/ROTATE T REG | 1 | 0 | 1 | 0 | SINK REGISTER | | | | | | S/R | S/R LEFT COUNT (0=>23; 0=CPL) | | | | |
| CARRY CYF | 0 | 0 | 0 | 0 | 0 | 0 | 0 | 0 | 0 | 1 | 1 | 0 | CYF ← CYO | CYF ← CYL | CYF ← 1 | CYF ← 0 |

FIG. 4

| COUNT FA/FL VARIANTS | |
|---|---|
| 000 | NO COUNT |
| 001 | INC FA |
| 010 | INC FL |
| 011 | INC FA; DEC FL |
| 100 | DEC FA; INC FL |
| 101 | DEC FA |
| 110 | DEC FL |
| 111 | DEC FA; DEC FL |

FIG. 5

| BIAS VARIANTS | | |
|---|---|---|
| 000 | 0 | UNIT |
| 001 | 1 | FL |
| 010 | 2 | SL |
| 011 | 3 | FL+SL |
| 100 | 4 | — |
| 101 | 5 | CPL+FL |
| 110 | 6 | — |
| 111 | 7 | CPL+SL+FL |

VARIABLE WORD WIDTH PROCESSOR CONTROL

FIELD OF THE INVENTION

This invention relates to digital processors, and more particularly, is concerned with processing operands and data of variable field length.

BACKGROUND OF THE INVENTION

Electronic digital processors are designed to provide a function generator or arithmetic unit, registers and internal transfer paths, a memory transfer path, and memory addressing mechanism which are designed to accommodate transfers of digital information with a fixed width. The width is the number of binary bits which can be transferred in parallel. A serial machine in which binary bits are transferred sequentially therefore has a width of 1 bit. Some machines are said to be serial by character where each character is binary coded and has a width determined by the number of bits per character. Most high-speed digital processors, however, fall into the class known as parallel machines in which the bits comprising a word are transferred in parallel. Single words may be as many as 64 bits. The width is, of course, a compromise between the number of bits normally required for transfer of instructions and operands and the higher cost inherent in increasing the number of bits transferred in parallel.

While serial by bit and serial by character machines provide the ability to readily vary the field length of operands and instructions, the relatively few number of bits transferred or manipulated per operation greatly limits the operating speed of such machines. The wider machines, by permitting parallel transfer of the bits of operands and instructions can be operated at higher speeds but present programming problems where data manipulations are required which involve fewer or more than the number of bits normally accommodated by the width of the machine. Double precision instructions are provided where operands exceeding the normal width of the machine are involved. Masking instructions may be required to operate on less than the full width of the machine in performing certain operations. Thus a burden is imposed on the programmer in designing the software where he desires to manipulate data having a width different than the design width of the machine.

SUMMARY OF THE PRESENT INVENTION

The present invention is directed to a processor which presents to the user a machine of variable width, giving the programmer the flexibility of utilizing operands and instructions of any desired width without modification of the program instructions. Once the width of an operand, for example, is specified, any instruction is executed by the machine as though the internal width of the machine corresponded to the specified width. No double precision instruction, or special instruction to mask and align the bits of less than a full word is required. This is accomplished, in brief, by providing a microprogrammed processor having a main memory that is addressable by bit boundary and length information stored in an address register. Although any length operand up to the maximum storage capacity of the memory can be specified by the contents of the address register, the processor hardware is designed as a parallel machine having registers and data transfer paths of fixed width. Execution of a particular program instruction is under control of a string of microoperators, the first of which sets a control register to either the width of the machine or the length of the operand specified by the address register, whichever is less. The instruction is then executed by the balance of the microoperator string as though the machine had the width specified by the contents of the control register. If the operand is greater in length than the width of the machine, the operand bit boundary length specified by the address register is incremented and decremented respectively by the amount specified by the control register, and the microoperator string is repeated until the width specified by the control register is reduced to zero, in which case the processor branches out of the string to fetch the next program instruction.

BRIEF DESCRIPTION OF THE DRAWINGS

For a better understanding of the invention reference should be made to the accompanying drawings, wherein:

FIG. 3 is a list of the microoperators for controlling the processor;

FIGS. 4 and 5 illustrate variant conditions of certain of the microoperators of FIG. 3.

DETAILED DESCRIPTION

Figures 1, 2:
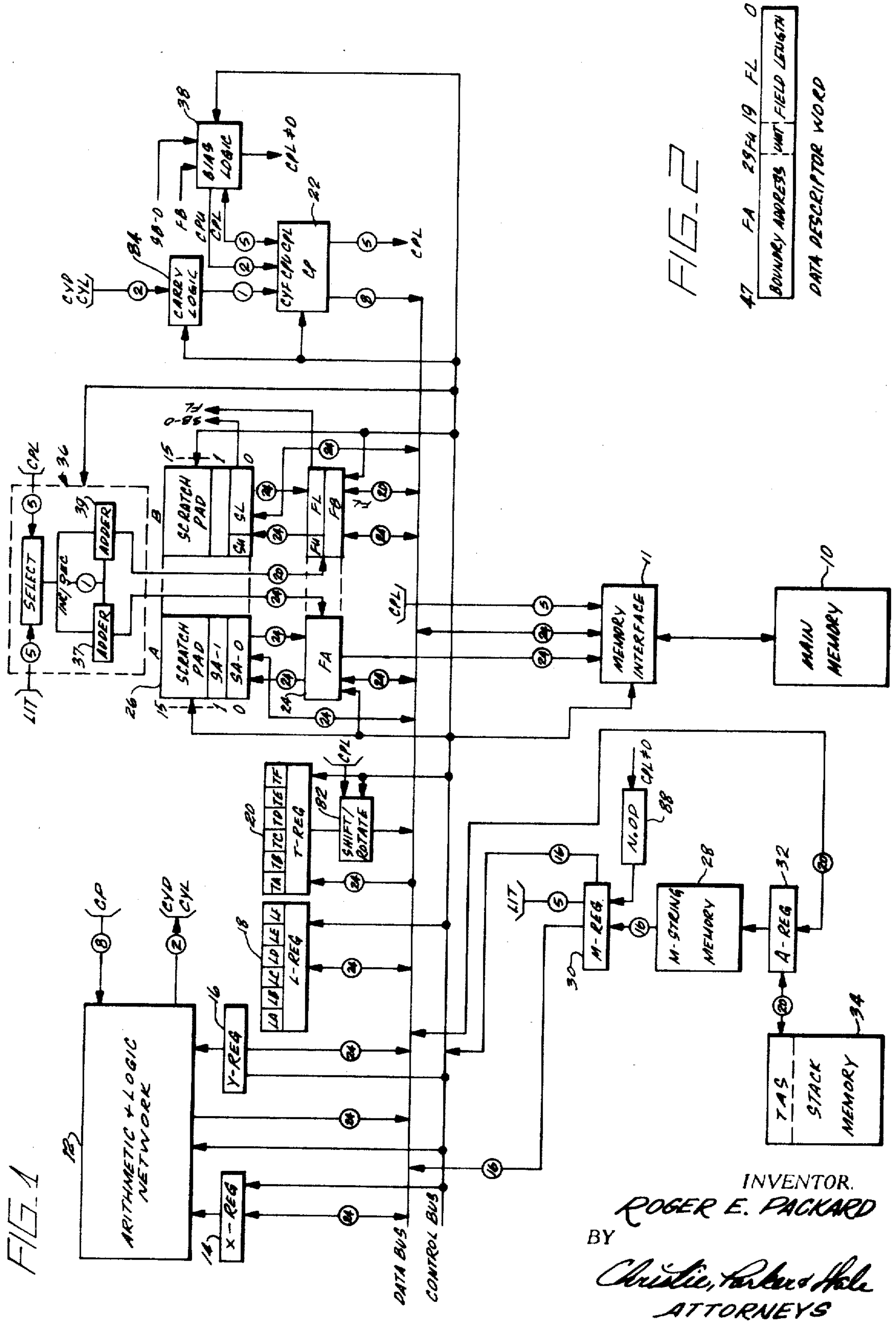
FIG. 1 is a block diagram of a processor incorporating the features of the present invention.
FIG. 2 shows the format of a data descriptor.

Referring to FIG. 1 there is shown a block diagram of the processor incorporating the features of the present invention. The processor operates by executing microoperators which provide transfer between various registers to be described and with a storage unit. The storage unit comprises a main memory 10 and memory interface control 11 which controls transfers of data between the main memory and a data transfer bus. The data bus has 24 parallel conductive paths providing parallel transfer of up to 24 bits between the main memory 10, an arithmetic and logic network 12, and a plurality of registers to be described. These registers include an X-register 14 and a Y-register 16 which provide storage for the two operands applied to two operand inputs of the arithmetic and logic network 12. Three operational registers are provided, an L-register 18, a T-register 20, and a CP-register 22. The L and T registers are general purpose registers which, together with the X and Y registers, serve as either the source or sink for all Read/Write operations with the main memory 10. Both the L-register and T-register are addressable as full 24-bit registers or as six 4-bit registers designated by the letters A through F.

The CP-register 22, for the purpose of the present description may be considered as only 8 bits in length and is connected to only the 8 least significant bit lines of the data bus. The CP-register functionally is divided into three sections designated CPL which is 5 bits in length, CPU which is two bits in length, and CYF which is 1 bit in length. The functional significance of these sections is described in detail below.

The main memory 10 is a field free memory, such as described in detail in copending application Ser. No. 157,307, filed June 28, 1971, and assigned to the same assignee as the present invention. All addressing is by field, in which the bit boundary marking the start of the field and the length of the field are specified by the address. A maximum of 24 bits is transferred in or out of memory in parallel during each memory access cycle.

The processor also includes a field definition section for storing descriptors defining fields in the main memory 10. The field definition section includes an F-register 24 which is a 48-bit register. The F-register is divided into two 24-bit sections FA and FB. The FB section in turn has two sections, an FU section which is 4 bits and an FL section which is 20 bits. As shown in FIG. 2, the FA section, when a data descriptor is present in the F-register 24, contains the bit boundary address and the FL section stores the field length of a field in memory (up to $2^{20}$ bits in length). The FU section is used to specify the unit size, e.g., binary (1 bit unit), binary coded decimal (4 bit unit), or an 8 bit code.

Associated with the F-register 24 is a scratchpad memory 26 which may, for example, store up to 16 48-bit words. The 16 word locations in the scratchpad memory are designated 0 through 15, respectively. The scratchpad memory is functionally divided into two sections, Section A and Section B, each 24-bits in width. The two sections of the scratchpad memory as well as the sections of the F-register 24 are separately addressable for transfers over the data bus. In addition all 48 bits of the F-register can be loaded from any of the 16 locations in the scratchpad memory, can be stored in any of the locations of the scratchpad memory, or can be exchanged with any location in the scratchpad memory.

Control of the processor is by means of strings of microoperators which are stored in an M-string memory 28. The microoperators in the string are transferred out of the M-string memory 28 one at a time into an M-register 30. The microoperators are 16 bits in length, the 16 bits in the M-register being applied to a control bus for distribution to control logic distributed throughout the processor and associated with the various registers, the arithmetic and logic network 12, the scratchpad memory 26, and the memory interface control 11. The control bus has 16 conductors for receiving the 16 control bits in parallel. The M-string memory 28 is addressed by an A-register 32. The A-register 32 contains the number of bits necessary to address all the cells in the M-string memory 28. Twenty bits are shown by way of example. Normally the A-register 32 is advanced by one each clock pulse, causing the next microoperator in sequence to be transferred from the memory 28 into the register 30. The same clock pulse which causes the new microoperator to be transferred into the M-register 30 also causes the execution of the current microoperator in the M-register. The A-register 32 can be set to any new address from the data bus to permit branching to a different string of microoperators in the M-string memory 28. A stack memory 34 is preferably provided which operates as a push-down stack for storing return addresses to permit return to a particular microoperator string following the calling of a subroutine of microoperators.

Referring to FIG. 3 there is shown a partial list of the microoperators which, when stored one at a time in the M-register 30, provide control signals over the control bus to cause particular operations to take place. Each mircooperator consists of 16 bits. A portion of these bits, anywhere from 3 to 12 of the bits, are coded to identify the particular microoperator. The remaining bits are coded to identify particular registers, individual sections of registers, various output functions of the arithmetic and logic network 12, and to control various modifications of the control function provided by the particular microoperator. For example, the first microoperator shown in FIG. 3 is called a Register Move and is identified by the binary bits 0001 in the four most significant bit positions of the microoperator. The next six bits identify the source register from which data is to be moved and the remaining 6 bits identify the sink register which is to receive the data over the data bus. The number of bits transferred over the data bus is not necessarily the contents of a full 24-bit register. As pointed out above, the L and T-registers, for example, have six 4-bit sections, each of which are separately addressable as either a source register or a sink register, in which case only 4 bits would be transferred over the data bus. Where less than an entire word of 24 bits is being transferred over the data bus, the corresponding number of the least significant bit lines of the data bus are used. For example, if the four bits of section LA of L-register 18 are specified as the source and the section TF of the T-register 20 is specified as the sink register, the 4 bits would be transferred over the four least significant lines of the data bus from LA to TF.

The 16 bits comprising the microoperator in the M-register 30 are applied to the control bus which distributes the bits to control logic in each of the active elements of the processor where the bits are decoded for controlling appropriate gating to effect the specified microoperation. It should be further noted that the arithmetic and logic network 12 produces a number of possible output conditions, such as a sum, a difference, the complement of X, the complement of Y, various logical functions such as X AND Y, X OR Y, X Exclusive OR Y, etc., each of which may be specified as the source register in the Register Move microoperator by the coding of 6 source identifying bits. The operation of the arithmetic and logic network 12 is described in detail in copending application Ser. No. 157,091, filed June 28, 1971, and owned by the assignee of the present application.

The next operator in the list in FIG. 3 is the Scratchpad Move microoperator. This microoperator controls transfers between any register, specified by the bits 6 through 11, and any of the sixteen word addresses in the scratchpad memory specified by bits 0 through 3. Since only a maximum of 24 bits can be transferred by the data bus, bit 4 of the Scratchpad Move microoperator designates whether the A section or the B section of the scratchpad memory is involved in the transfer. Bit 7 of the Scratchpad Move microoperator designates whether the specified register is the source or the sink.

The third microoperator of the partial list shown in FIG. 3 is the Read/Write Memory microoperator. Bit 11 specifies whether a Read or a Write operation is required. Bits 6 and 7 specify the register which is the source or sink for the memory operation. Only 2 bits are necessary since memory transfers are limited to only four registers, namely the X-register 14, the Y-register 16, the L-register 18, and the T-register 20. The first 5 bits 0 through 4 are used to specify the number of bits in the word being transferred, and may specify any number of bits from 0 up to 24. If a 0 width is specified by the Read/Write Memory microoperator, the number of bits transferred is controlled by the 5 bits in the CPL section of the CP-register 22, as will hereinafter be more fully explained.

Since every memory transfer operation requires addressing of main memory from the F-register 24, it may be desirable to either increment or decrement the bit boundary address specified by the contents of the FA section of register 24 and/or increment or decrement the FL section of the F-register 24. These operations are specified by the Count FA/FL bits 8, 9, and 10 of the Read/Write Memory microoperator. The coding of these three variant bits is shown in the table of FIG. 4. The amount by which the FA and FL registers are incremented or decremented is always the same as the number of bits transferred in the memory operation, as specified either by the 5 bits in CPL or by the first 5 bits of the Read/Write Memory microoperator when not equal to zero.

The incrementing and decrementing function is controlled by a circuit indicated generally at 36. This circuit receives the control bits from the M-register 30 over the control bus and, by means of a gating circuit, (not shown) selects either the 5 bits from CPL or the 5 bits (LIT) from the microoperator in the M-register 30 and couples them to either or both of two adders 37 and 39. The two adders are coupled respectively to the contents of the FA and FL register sections. The adders either add to or subtract from the contents of FA and FL the amount determined by CPL or LIT.

Referring again to FIG. 3, the next microoperator in the list is the Branch microoperator. This microoperator is identified by 110 in the top 3 bits of the word in the M-register 30 and results in the first 13 bits of the microoperator in the M-register 30 being transferred to the 13 least significant bit positions of the A-register 32. This causes the M-string memory 28 to branch to a new location, for example, to loop back to the start of a string of microoperators or to jump to a different string of microoperators in the M-string memory 28.

The next microoperator of FIG. 3 is the Count FA/FL microoperator. Bits 5, 6, and 7 are the Count FA/FL variant bits and provide the identical function as in the Read/Write Memory for incrementing or decrementing the FA and FL register sections according to the conditions set forth in FIG. 4. The first 5 bits, if not equal to zero, are used as a literal for determining the amount by which these registers are incremented or decremented. Otherwise the 5 bits in CPL are used.

Yet another microoperator, shown next in the list of FIG. 3, is the Exchange operator. This operator is used to exchange 48-bit words between the cells in the scratchpad memory 26 and the F-register 24. Two scratchpad memory cells are identified in the microoperator, one of which is the source and one of which is the sink in the exchange operation. These addresses may point to the same cell in the scratchpad memory. Execution of this microoperator causes the 48-bit word in the cell specified by the source address to be placed in the F-register 24 and at the same time the word stored in the F-register 24 to be placed in the cell specified by the sink address.

The next microoperator in the list of FIG. 3 is called the Bias microoperator and is identified by the 12 bits 4 through 15. The function of the Bias operator is to set the CPL and CPU sections of the CP-register 22 by means of a bias logic network 38. The bias logic network is shown in more detail in FIG. 6. The three bias variant bits are received by the bias logic network 38 over the control bus from the M-register 30 and are applied to a decoder 40 which activates one out of eight output lines, designated 0 through 7. These correspond to the eight conditions set forth in FIG. 5 for the bias variants.

For the 0 condition of the decoder output, a gate 42 transfers the unit value in the FU section of the register 24 to the CPL section of the register 22, thereby setting the CPL bias value to correspond to the unit size specified by the descriptor stored in the F-register. If the decoder is set to 1, CPL is set through a gate 44 by the output of a logic circuit 46 which provides an output corresponding to one of two inputs, whichever has the lesser value. In the case of the logic circuit 46, the two inputs are from the FL section of the F-register 24, which specifies the field length of the operand addressed by the descriptor in the F-register, and from the binary-coded output of a constant ($K = 24$) generating circuit 48, the output of which is equal to 24, the maximum number of bits which can be transferred during one operation over the data bus. The logic circuit 46 includes a Compare circuit 50 which is coupled to the two inputs FL and K and provides one of two output signals, K<FL and K>FL. These outputs are applied respectively to gates 52 and 54 whereby the lesser of the two inputs K and FL is gated to the output through an OR circuit 56.

When the output of the decoder 40 is set to 2, corresponding to the third variant condition in the table of FIG. 5, it activates a gate 58 coupling the output of a logic circuit 60 to the CPL section of the CP-register 22. The logic circuit 60, which is identical to the logic circuit 46, compares the SL section of the 0 address location of the scratchpad memory 26 with the constant $K = 24$ to determine which is the lesser of the two, thereby setting CPL to the lesser of the field length provided by the descriptor in the first cell of the scratchpad memory or the constant 24.

If the decoder 40 is set to 3, a gate 62 similarly gates the output of an identical logic circuit 64 to CPL. The two inputs of the logic circuit 64 are derived respectively from the outputs of the logic circuits 46 and 60, thereby providing an output which corresponds to the lesser of K, FL, and SL. A gate 66, when the decoder 40 is set to 5, gates the output of a logic circuit 68 to CPL. The two inputs to the logic circuit 68 are respectively existing contents of the CPL section of the CP-register 22 and the output of the logic circuit 46. Thus the output of the logic circuit 68 corresponds to the lesser of the three values K, FL and CPL. A gate 70 similarly couples the output of a logic circuit 72 to CPL when the decoder is set to 7. The inputs to the logic circuit 72 are derived from the output of the logic circuit 64 and the output of the logic circuit 68. Thus the output of the logic circuit 72 corresponds to the lesser of K, FL, SL, and CPL.

Figure 6:
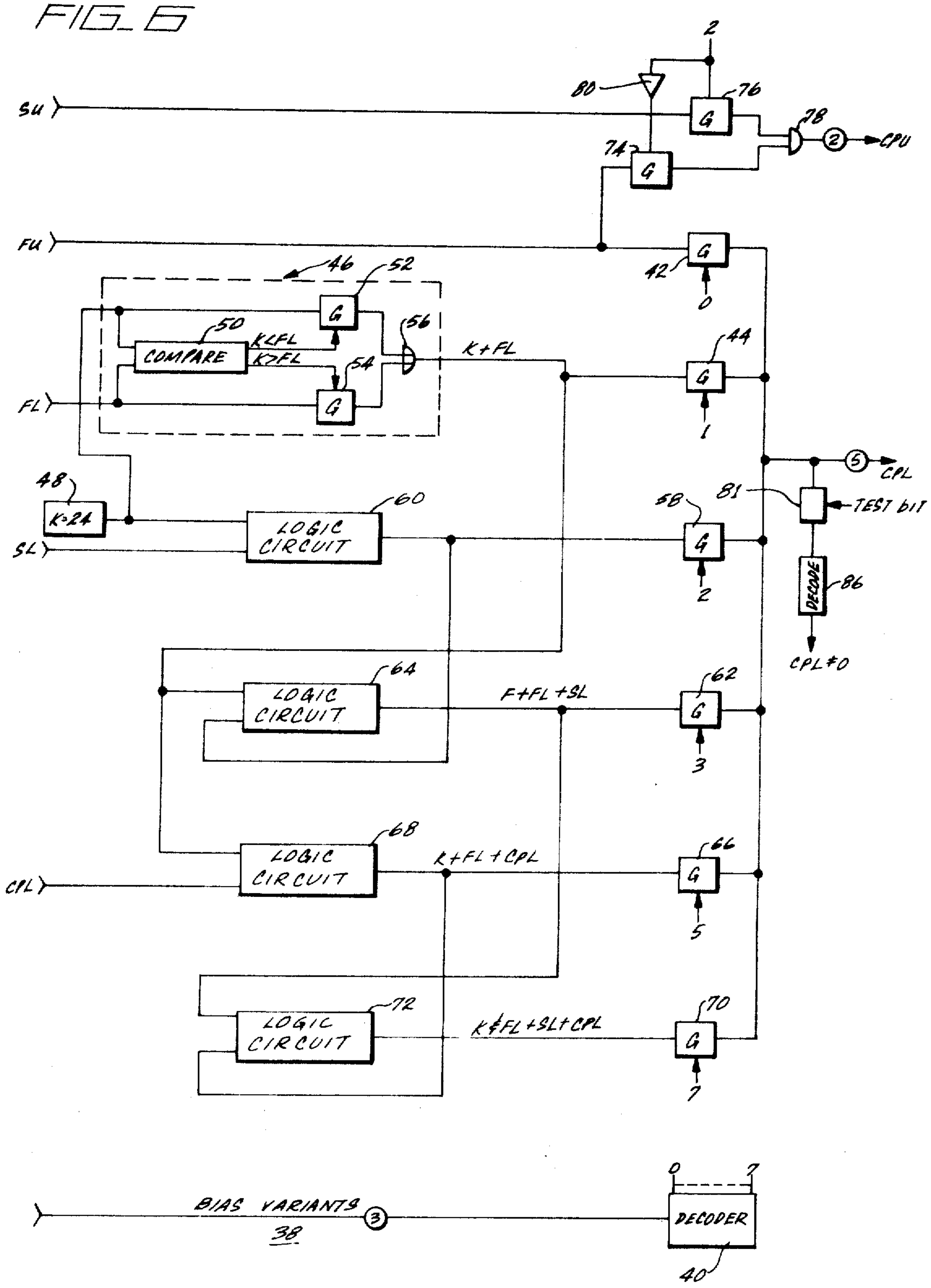
FIG. 6 is a block schematic diagram of a portion of the control circuitry of the processor of FIG. 1.

The bias logic circuit 38, as shown by FIG. 6, also sets the CPU section of the CP-register 22 to the unit value stored in the FU section of the F-register 24 or the SU section of the first cell of the scratchpad memory 26. This is accomplished by a pair of gates 74 and 76 which respectively couple FU and SU through an OR circuit 78 to the CPU section of the CP-register 22. SU is used only when the bias variants indicate that a Bias by SL operation is taking place. Thus the output 2 from the decoder 40 is applied to the gate 76. The same output is applied through an inverter 80 to the gate 74 so that FU is applied to CPU in all other bias variant conditions other than 2.

Another feature of the Bias operator is the Test bit, located in the zero bit position of the Bias microoperator, as shown in FIG. 3. If the Test bit is on, it causes the 5 bits going to the CPL section of CP-register 22 to be gated by a gate 81 (see FIG. 6) to a decoding circuit 86, which provides an output signal indicating when CPL does not equal 0 (CPL ≠ 0). The function of the test is to cause the processor to skip the next microoperator in the string whenever CPL is not set to 0. During the execution of the Bias microoperator in the M-register 30, if the output of the decoding circuit 86 indicates that CPL ≠ 0, the M-register 30 is forced to all 0's during the fetching of the next microoperator. All 0's in the M-register 30 are referred to as a NoOP. This results in no operation taking place during the next clock pulse while the next microoperator in the string is being fetched from the M-string memory 28. The forcing of all 0's in the M-register 30 is provided by a NoOP circuit 88 which is activated in response to the CPL ≠ 0 output of the decoding circuit 86 during the fetching of the next microoperator.

By this arrangement, the next microoperator following the Bias microoperator in the program string might be a Branch operation. The Branch operation is executed only if CPL is set to 0 by the Bias operation, otherwise the Branch operation is replaced by a NoOP, and the next microoperator in the string following the Branch is fetched into the M-register 30.

In addition to the Read/Write memory operator described above, other microoperators utilize the content of the CPL section of the CP-register 22 as set by the Bias operator to control automatically the number of operand bits involved in the microoperation. One such operation is the Shift/Rotate T-Register. This microoperator, as shown in FIG. 3, is identified by the code 1010 in the top 4 bit positions. The operator causes the contents of the T-register 20 to be shifted or rotated to the left during transfer to a sink register. The operator specifies a sink register by the next six bits, which may include the T-register itself as the sink. The next bit indicates whether a shift or a rotate operation is to take place. The last 5 bits specify the number of bit positions. The contents of the T-register is shifted or rotated to the left in the transfer to the sink register. If the sink register is other than the T-register itself, the contents of the T-register remain unchanged. The left count may be any value from 0 to 23. A value of 0 indicates that the left count is to be controlled by the contents of CPL. Thus the left count in a shift or rotate operation is determined by the value of CPL as set by the Bias microoperator discussed above. The Shift/Rotate logic for the T-register 20 is indicated at 82 in FIG. 1.

The manner in which the Bias microoperator is utilized in the operation of the processor of FIG. 1 may be best understood by considering a specific example, such as an addition operation. Consider the case where two operands A and B are to be added and the sum replaces the operands in the accumulator, i.e., the Clear and Add instruction found in conventional processors. Because the present processor is a microprogrammed processor, the instructions comprising the object program are stored in the main memory. Each instruction is executed by a string of microoperators stored in the M-memory 28. Also stored in M-memory is a string of mirooperators which control the addressing and reading out of the next program instruction from the main memory using a descriptor in the scratchpad memory, determining from the OP code section of the instruction the starting address in the M-memory of the micro string which executes that instruction within the processor and which, in response to the addresses of the operands provided by the instruction, loads data descriptors in the scratchpad memory. This is all accomplished by a microprogrammed Fetch routine.

In executing the ADD instruction, the string of microoperators read out in sequence from the M-string memory 28 to the M-register 30 would include the following:

| | |
|---|---|
| START | |
| BIAS | BY FL & TEST |
| BRANCH | EXIT to NEXT ROUTINE |
| READ/WRITE | READ to X; INC FA; DEC FL |
| EXCHANGE | S-O ← F F ← S-O |
| READ/WRITE | READ to Y |
| MOVE | BINARY SUM to T |
| CARRY | CYF ← CYL |
| WRITE | WRITE From T; INC FA; DEC FL |
| EXCHANGE | S-O ← F F ← S-O |
| BRANCH | GO TO START |

Further, prior to executing the ADD instruction, during the Fetch routine a descriptor specifying the starting address and field length of the operand A is stored in the F-register 24 while a descriptor specifying the starting address and field length of the operand B is located in the scratchpad memory 26 in the address location 0. The descriptors for the operands A and B, for example, have a format as illustrated in FIG. 2 which shows a data descriptor word in the F-register 24.

The descriptors may indicate, for example, that the operand A starts at address boundary location 1000 (FA = 1000) has a field length of 37 bits (FL = 37) and the unit size specified is one binary bit (FU = 0). For the operand B, in the 0 location of the scratchpad memory 26, the bit boundary address in the main memory, for example, may start at 2000 (SA-1 = 2000), with the field length being 37 bits (SL = 37), and the unit size again being 1 binary bit (SU = 0).

Referring again to the chart, the first microoperator is a Bias operator in which, by means of variant 1 (see FIG. 5) it compares FL with 24 and stores the lesser value in the CPL section of the CP-register 22, in the manner described above in connection with FIG. 6. The CP-register 22 is thus set with the first 5 bits indicating CPL = 24, since 24 is initially less than the 37 bits specified by FL and SL. The test bit of the Bias operator is initially on, requiring a test to determine if CPL is being set to 0. Since it is being set to 24, a NoOP is set into the M-register 30 in place of the next microoperator, which is a Branch operator. The NoOP causes nothing to happen during the next clock so that the next microoperator in the string is fetched into the M-register 30.

As shown by the above chart, the next microoperator is a Read/Write microoperator which causes the 24 least significant bits of the operand A to be transferred from memory to the X-register 14 using the bit boundary address in the FA portion of F-register 24 and the contents of CPL to determine the number of bits being transferred, namely 24 bits. The Read microoperator also specifies that FA is to be incremented by CPL and that FL is to be decremented by CPL. It will be noted that the Count variant in the Read microoperator is set to 011 to specify the incrementing of FA and decrementing of FL according to the Count variants of FIG. 4. The five lowest order bits of the microoperator, corresponding to the transfer width of the Read operator, are set to 0, indicating that the number of bits to be transferred and the incrementing and decrementing of FA and FL is to be controlled by the contents of the CPL section of CP-register 22.

The next microoperator in the string is the Exchange operator which causes the descriptors in the F-register 24 and the address location 0 of the scratchpad 26 to be exchanged, thereby placing the descriptor of the operand B in the F-register 24. This is followed by another Read operator in which the sink register is specified as the Y-register 16. The count variant is set to 0 indicating that no incrementing or decrementing is to take place during the execution of the Read operator. Again the transfer width is set to 0 so that the contents of the CPL section of the CP-register 22, as set by the Bias operator, is used to control the number of bits transferred from the main memory 10 to the Y-register 16.

With the 24 least significant bits of the A operand in the X-register 14 and the 24 least significant bits of the B operand in the Y-register 16, the arithmetic and logic network 12 provides an output which is the binary sum of the operands in the X and Y registers. The number of parallel bits from the output of the arithmetic and logic network 12 is controlled by the immediate value CPL, namely, 24. The manner in which the arithmetic and logic network provides variable length results in response to the setting of CPL is fully described in the above-identified copending application Ser. No. 157,091, filed June 28, 1971.

The next microoperator is a Move operator which transfers the binary sum at the output of the arithmetic and logic network 12 to the T-register 20 over the data bus. As pointed out above, in connection with the Move operator as specified in FIG. 3, the various arithmetic and logic results generated by the network 12 can be specified separately as a source by the Move operator. In this case the source bits of the Move operator, as present in the M-register 30, coupled to the network 12 over the control bus selects the binary sum from the output of the network 12 and gates it to the data bus. At the same time, the Move operator specifies by means of the control bus the T-register 20 as the sink register, thereby causing the binary sum of the least significant 24 bits of the A and B operands to be loaded over the data bus to the T-register 20. If the arithmetic and logic network 12 has produced a carry as the result of the addition, this carry is used to set the carry flip-flop in the CP-register 22 by means of the following Carry operator. A carry logic circuit 84 selects the proper carry bit (CYL = binary carry; CYD = decimal carry) from the output of the network 12 in response to the carry operator in the M-register 30 and stores it in the CYF section of the CP-register 22.

This is followed by a Write operator which specifies the T-register 20 as the source, specifies CPL as the transfer width, and uses FA as the boundary address in the main memory 10. Since this is the same address which was used to read out the B operand, it will be seen that the 24 least significant bits of the sum of the two operands replaces the least significant bits of the operand B in main memory 10.

At the same time, the bit boundary address in FA is incremented by CPL and the field length FL is decremented by CPL, so as to point to the remaining bits of the B operand in the main memory 10. Again an exchange operator causes the contents of the F-register 24 to be exchanged with the descriptor in the address location 0 of the scratchpad memory 26, thereby restoring the modified descriptor of the remaining bits of the A operand into the F-register 24. The following Branch microoperator causes the A-register 32 to be reset to the starting address of the ADD micro string, starting with the Bias microoperator.

The Bias microoperator, when again executed, sets CPL to the lesser of the decremented value of FL and 24. Since, in the example given in which the operands consist of 37 bits, FL has been decremented to 13 (37–24), CPL is now set by the Bias operator to 13. Again since CPL is ≠ to 0, the test results in the following Branch operand being replaced by a NoOP and the balance of the microoperator string is executed again. With CPL set to 13 instead of 24, the Read/-Write operators and the Move operator involve the transfer of only 13 bits over the data bus between memory and the X and Y registers, between the arithmetic and logic network 12 and the T-register 20, and between the T-register 20 and the memory. Thus the processor operates as though it were 13 parallel bits in width. The 13 bits, representing the binary sum of the 13 bits in the X and Y-registers plus the carry value in CYF, are restored to memory in the B operand field following in sequence the previous 24 bits, so that 37 bits are now stored in memory in the location of the B operand.

Again the A-register 32 is reset to the starting address of the micro string in the M-memory, but this time FL is zero and therefore CPL is set to zero. This is sensed by the Bias operator test, and therefore the next operator in the string is not skipped. As a result, the following Branch operator causes the A-register 20 to be set to the address of the Fetch routine and the next instruction is fetched from main memory.

While the above example shows how the Bias operator is utilized in connection with a string of microoperators for executing an Add instruction, the Bias operator may be used at the start of any microprogram subroutine which utilizes any of the microoperators that reference the CPL section of the CP-register 22.

As seen from the description above, CPL is implicitly involved in the Move operator where one of the possible output functions of the arithmetic and logic network 12 is specified as a source, since CPL is used to control the number of bits in the output of the network 12. The value of CPL, as set by the Bias operator, is explicitly involved in the Read/Write operator, the Count FA/FL operator, and the Shift/Rotate T-register operator if the 5 least significant bits of these operators are set to zero, as described above in connection with FIG. 3. the Bias operator can be used with any subroutine that utilizes any one or more of these operators.

The several variant conditions of the Bias operator permit different types of memory access operations to occur. Variant condition 1 (see FIG. 5), by setting CPL to the unit size specified by FU or SU permits one unit, i.e., a single binary bit, a BCD 4-bit digit, or a BCD 8-bit character, to be transferred in or out of memory on each execution of the following Read/Write Memory operator. Thus the processor may operate as a serial by bit or serial by character type machine. The variant conditions 5 and 7 of the Bias operator permit an operand to be transferred in or out of memory in units less than 24 bits. For example, by initially setting CPL to 8 and FL to 40, using the variant 5, the operand is transferred eight bits at a time until the full 40 bits of the operand are transferred. In the case of variant 1, using the same example, the operand is transferred 24 bits followed by 16 bits.

CONCLUSION

From the above description, it will be recognized that a processor is provided which is capable of executing program instructions on operands of any length. The Bias operator, in setting the CPL section of the control register to the lesser of the width of the data transfer paths in the processor or the remaining length of the operand, permits the processor to operate as though the internal width were less than the width of the transfer paths within the processor. Thus where the operand is greater in width than the transfer paths within the processor, the operand can be manipulated in sections, each corresponding to or being within the limits of the transfer width of the processor with the processor automatically adjusting to a lesser effective width where the last remaining section of the operand is less than the transfer width of the machine. Thus the user in designing the object program need not modify the program instructions in any way to accommodate different operand lengths. By providing the Bias microoperator at the start of any microoperator string for executing a particular instruction, the processor automatically adjusts its internal operation to whatever is required to accommodate a particular length of operand in the execution of a program instruction.

What is claimed is:

1. A microprogram computer comprising an addressable variable field length memory for storing binary coded information, an address register for storing an address, the address specifying any bit location in memory and specifying a number of bits in memory, a variable operand width parallel arithmetic unit, a control register, means for setting the control register to any one of a plurality of control conditions representing different control operations, a bias register for storing control width information specifying a number of bits, the bias register output being coupled to the arithmetic unit to control the operand width of the arithmetic unit output, means generating a binary coded signal representing a constant corresponding to the number of parallel bits in the maximum operand width operation of the arithmetic unit, means responsive to a first control condition of the control register for comparing the number of bits specified by the address register with the output of said constant generating means and setting the bias register to the lesser of the two compared numbers, and means responsive to a second control condition of said control register for effecting transfer of a group of bits from the memory to the arithmetic unit, said transfer means including means responsive to the bit location address in the address register and the number of bits specified by the contents of the bias register for limiting the transfer to a number of bits in parallel from the memory corresponding to the number specified by the bias register.

2. A computer for processing variable length operands comprising: a free field memory storing data in the form of binary bits, the memory including memory control means for transferring a variable number of bits up to a predetermined maximum number of bits in parallel from contiguous bit address locations into or out of memory during a memory cycle, a first register for storing a bit address and the number of bits in a field in memory, a second register for storing the number of bits to be addressed during a memory cycle, means coupling the bit address portion of the first register and the contents of the second register to the memory control means for indicating the bit address location and number of bits respectively for a memory cycle, means responsive to a first control signal for setting the second register to the lesser of the number of bits specified by the contents of the first register and said predetermined maximum number of bits that can be transferred in parallel in and out of memory, and means responsive to a second control signal for initiating a memory cycle.

3. Apparatus of claim 2 further including means responsive to said second control signal for changing the contents of the first register by the contents of the second register at the completion of the memory cycle.

4. Apparatus as defined in claim 3 wherein said means for changing the contents includes means for selectively incrementing or decrementing either or both the bit address and the number of bits by the amount specified by the contents of the second register.

5. Apparatus of claim 2 further including an arithmetic unit for doing arithmetic and logic operations on two input groups of parallel binary bits to produce a coded binary result, the arithmetic unit including control means coupled to the second register for limiting the number of parallel bits in the result to the number specified by the second register.

6. A microprogrammed data processor system comprising: an addressable memory, memory accessing means for initiating a transfer into and out of memory of a specified number of bits in parallel up to a predetermined fixed maximum number starting at a specified bit location, means for storing at least one electrically coded descriptor word having a first section specifying a bit location of the start of a field in memory and a second section specifying any number of bits forming the length of a field memory, a bias register having a first section for specifying a number of bits to be used in executing particular microoperations, means coupling the first section of a descriptor word stored in said descriptor word storing means and means coupling the first section of the bias register to the memory accessing means during a memory access to control respectively the specified starting bit location and the number of bits addressed in memory, and control means for setting the first section of the bias register to a predetermined number for controlling the number of bits involved in a memory transfer by said accessing means.

7. Apparatus as defined in claim 6 wherein said processor further includes an arithmetic and logic unit for performing a plurality of arithmetic logical and operational functions on input operands, and second control means responsive to the bias register for controlling said unit to provide an output having a number of parallel bits corresponding to the number specified by the bias register.

8. Apparatus as defined in claim 6 wherein said data descriptor words have a third section designating one of a plurality of types of units in which data may be coded, different types being coded with different numbers of bits, and said control means including means responsive to the third section of the descriptor word in the descriptor word storing means for setting the first section of the bias register to a number corresponding to the number of bits in the unit type specified by the descriptor word, whereby the memory access means causes transfer of a number of bits corresponding to one unit of the specified unit type.

9. Apparatus as defined in claim 6 wherein said control means includes means for setting the first section of the bias register to the lesser of the number in the second section of the data descriptor word stored in said descriptor word storage means and a constant corresponding to said predetermined fixed maximum number of bits transferable by said memory accessing means.

10. Apparatus as defined in claim 6 wherein said control means includes means for setting the first section of the bias register to the lesser of the number in the second section of the data descriptor word stored in the descriptor word storing means, the number in the first section of the bias register, and a constant corresponding to said predetermined fixed maximum number of bits transferable by said memory accessing means.

11. Apparatus as defined in claim 6 further including means for selectively changing the numerical value of the contents of the first and second sections of the data descriptor word in the descriptor word storing means by an amount determined by the number in the first section of the bias register.

12. A microprogram computer in which stored instructions are executed in sequence, each instruction being executed by a selected sequence of stored microoperators, said computer comprising: an addressable memory for storing binary bits representing stored data, memory access control means when activated initiating a transfer of a variable number of contiguous bits up to some maximum number of bits in parallel into or out of memory starting at any selected bit location in memory, means including a microoperator storage register for storing a group of microoperators and transferring the microoperators one at a time in sequence to the storage register, means for storing a plurality of descriptor words, each descriptor word having a bit address section and a bit number section, a bias register having a bit number section, first control means responsive to a first microoperator in the microoperator storage register for setting the bit number section of the bias register to a selected value, and second control means responsive to a second microoperator in the microoperator register activating the memory access control means, the second control means including means coupling the contents of the first section of a predetermined descriptor word in the descriptor word storing means and the contents of the first section of the bias register to the memory access control means for controlling the bit address and number of bits in the memory transfer.

13. Apparatus as defined in claim 12 further including constant generating means for generating a coded number indicating said maximum number of parallel bits that can be transferred to or from the memory by said access control means, comparing means having a plurality of inputs, one input being coupled to the constant generating means and another input being coupled to the contents of the second section of said predetermined descriptor word in the descriptor word storing means, the comparing means selecting the lesser number applied to the inputs, and means responsive to said first microoperator in the microoperator storage register and said selecting means for setting the first section of the bias register to said selected lesser number.

14. Apparatus as defined in claim 13 wherein the selecting means has another input coupled to the contents of the first section of the bias register.

15. Apparatus as defined in claim 14 wherein the selecting means has another input coupled to the contents of the second section of another descriptor word in the descriptor word storing means.

16. Apparatus as defined in claim 12 further including means responsive to the first microoperator in the microoperator storage register for sensing when the first section of the bias register is set to zero, and means responsive to the sensing means for selecting and inserting one of two different microoperators into the storage register, depending on whether the bias register is zero or not zero.

17. Apparatus as defined in claim 12 further including means responsive to said second microoperator in the storage register for changing the contents of the first section of the predetermined data descriptor word by the amount of the contents of the first section of the bias register.

18. Apparatus as defined in claim 12 further including means responsive to said second microoperator in the storage register for changing the contents of the second section of the predetermined data descriptor word by amount of the contents of the first section of the bias register.

19. A processor in which operations are controlled by strings of micro-operators executed in sequence, comprising a bias register, a field length register, means setting the field length register to a predetermined numerical state, an arithmetic unit including a variable width parallel adder for adding two operands and generating a resultant operand, the arithmetic unit including control means responsive to the contents of the bias register for controlling the number of significant bits in the resultant operand, constant-generating means indicating in electrically coded form the maximum parallel bit capacity of the adder, and means comparing the content of the field length register and the constant-generating means for setting the bias register to the lesser of the numerical state of the field length register and the maximum parallel bit capacity.

20. Apparatus as defined in claim 19 further including means for decrementing the contents of the field length register by the contents of the bias register.

21. In a microprogrammed computer in which macroinstructions are executed by strings of microoperators and the computer processor is structured to transfer data as groups of parallel binary bits, the method of providing variable length operand capability comprising:

1. setting a first register to the number of bits of a first operand to be used in executing the macroinstruction;
2. setting a second register to the number of bits of a second operand to be used in executing the macroinstruction;
3. setting a third register to the lesser of the number of parallel bits handled by the processor structure, the number of bits identified in the first register, and the number of bits identified in the second register;

4. executing in sequence each of the micro-operators in said string;
5. transferring within the processor only the number of bits in parallel specified by the third register in manipulation of the operands by said micro-operators in the string;
6. decrementing the numbers stored in the first and second registers by the number in the third register;
7. after execution of the string of micro-operators, again setting the third register to the lesser of the number of parallel bits handled by the processor structure, the number of bits identified in the first register, and the number of bits identified in the second register;
8. if the resulting number in the third register is greater than zero, repeating the execution of the micro-operator string.

* * * * *